Figure 1:
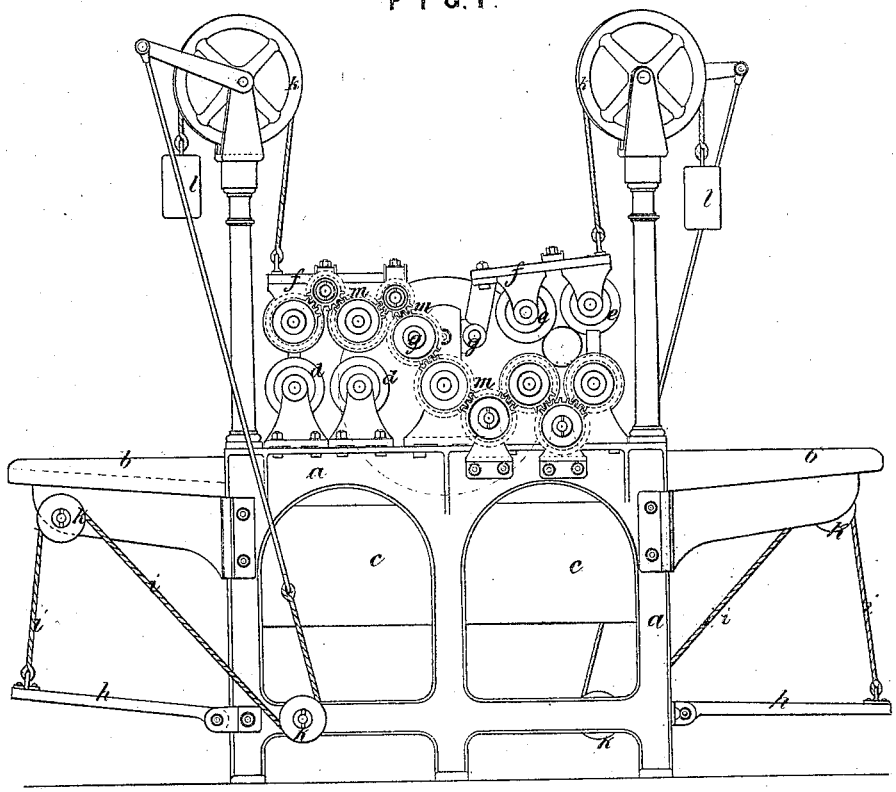

Kirk, Shelmerdine & Froggatt.
Felting Machine.

No. 101,276. Patented Mar. 29, 1870.

2 Sheets, Sheet 2.

*Kirk, Shelmerdine & Froggatt,*
*Felting Machine.*

No. 101,276. Patented Mar. 29, 1870.

Witnesses
George Davies C.E.
John Hughes

James Kirk
Samuel Shelmerdine
Cephas Froggatt

United States Patent Office.

JAMES KIRK, SAMUEL SHELMERDINE, AND CEPHAS FROGGATT, OF STOCKPORT, GREAT BRITAIN.

Letters Patent No. 101,276, dated March 29, 1870.

IMPROVEMENT IN MACHINES FOR FELTING HAT-BODIES.

The Schedule referred to in these Letters Patent and making part of the same.

*To all whom it may concern:*

Be it known that we, JAMES KIRK and SAMUEL SHELMERDINE, hat manufacturers, and CEPHAS FROGGATT, machinist, all of Stockport, in the county of Chester, Kingdom of Great Britain and Ireland, have invented certain new and useful Improvements in the Machinery used for Felting or Planking the Bodies of Hats or Bonnets and other coverings for the head; and we do hereby declare the following to be a full, clear, and exact description of the same, reference being had to the accompanying drawings and to the letters of reference marked thereon.

The object of our invention is to felt (or what is termed "plank") the bodies of hats, or other coverings for the head composed of woollen felt; and In carrying out our invention, we propose to use two or more sets of rollers upon the same frame-work or standards; or, in other words, to make the machines double, three-fold, or four-fold, or more, according to circumstances, thereby increasing their productive capabilities, and at the same time greatly economizing the cost of making the machine and the power and appliances required to drive it, as well as enabling one man to attend to more than one machine at a time, and thus economize his labor.

We also propose to form the working-surfaces of these rollers of elliptical rings, of India rubber, metal, or other suitable material, placed at such an angle and so close together that they shall each overlap the other, and so dispense with the necessity for the endwise motion usually imparted to such rollers; and in some cases we propose to substitute straight or slightly-twisted projections, placed on the bias, and so as to overlap, and also to use rollers with longitudinal grooves, running on a slight incline from end to end.

Under some circumstances, also, we propose to make these rollers of a great length, so that two or more parcels or quantities of hat-bodies can be operated upon at once by one set of rollers, which will again amplify their producing power.

And, further, instead of driving the rollers by means of endless chains, or other means heretofore employed, we propose to drive them by a series of spur-wheels, so arranged that the necessary motion and direction shall be given to each particular roller at the same time that the top rollers can be raised (for removing and replacing the rolls or parcels of hat-bodies) and lowered, the wheels all the time remaining in gear, whatever may be the position of the top rollers.

In order to enable others skilled in the art to make and use our invention, we will now proceed to describe its construction and operation.

On reference to the accompanying two sheets of drawings which form part of this specification—

Figure 2:
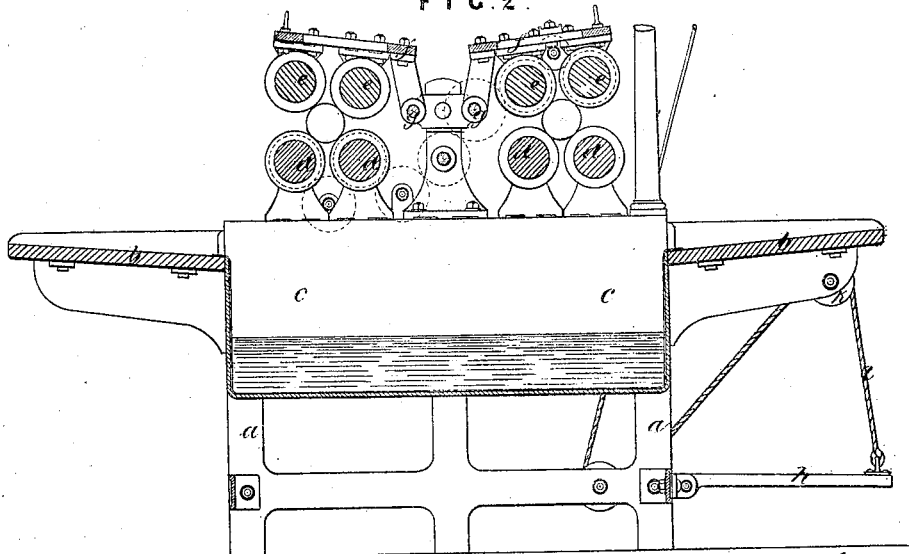

Figure 1 is an end elevation;

Figure 2, a vertical section; and

Figure 3:
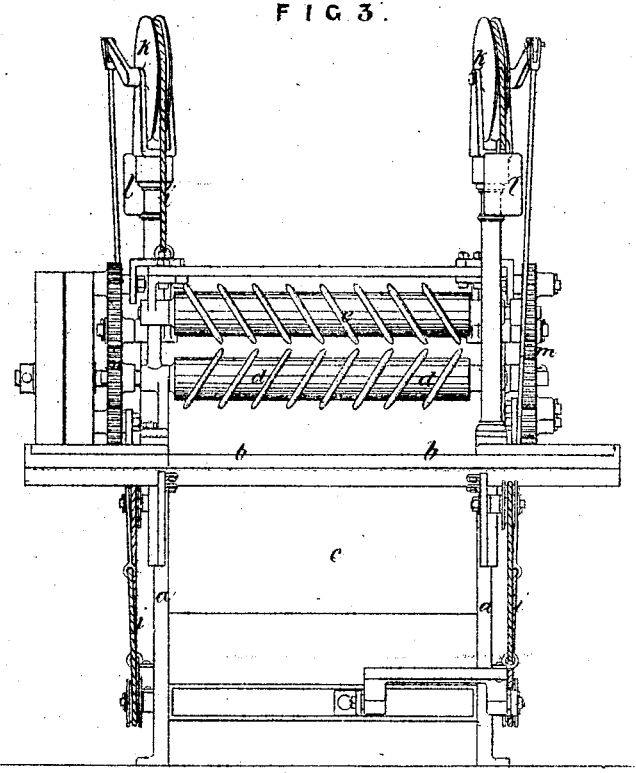

Figure 3, a front elevation of a planking-machine with two sets of rollers, (*i. e.*, a double machine,) constructed according to our invention.

*a a* are the standards or side framing of the machine;

*b b* are the tables or "planks"; and

*c c*, a vessel or cistern common to both, for containing the hot acid liquor in which the hat-bodies are dipped.

*d d* are the bottom rollers, mounted in brackets bolted to the frame, and

*e e* are the top rollers, carried by frames *f f*, mounted and capable of turning over on the shafts *g g* as on a hinge.

The frames and rollers are raised, when required, by means of the treadles *h h* and cords *i i*, passing round pulleys *k k*, the weight of the frame and rollers being partly relieved by the counterbalance-weights *l l*.

The bottom and top rollers *d d* and *e e* are all driven in the right direction, and at a uniform speed, by the trains of spur-gearing *m m m m*, which latter are so arranged that they always keep in gear, whether the frame *f f* is raised or not, the wheel of the back top roller rolling over the teeth of the wheel on the shaft *g* as the frame is raised or lowered.

The working-surface of the rollers in fig. 3 is shown as composed of a series of elliptical rings, (see detached view, Figure 4,) placed at such an angle upon the roller and at such a distance apart, that the upper edge of one ring shall overlap the lower edge of the one next to it, and thus every part of the roll of hat-bodies is acted upon, and the necessity for imparting endwise motion to the rollers is dispensed with. This is a most important feature of our invention.

Figure 6:
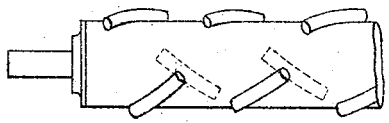
Figure 7:
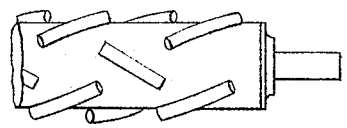
Figure 5:

In some cases we propose to incline half of the elliptical rings in one direction, and the other half in the opposite direction, as seen at Figure 5; and we also wish to reserve to ourselves the right to substitute straight or slightly-twisted projections, placed on the beds, and so as to overlap either in one direction only, as seen at Figure 6, or in both directions, as seen in Figure 7.

We also propose, in some cases, to make any one or more of the rollers of a set either plain or with longitudinal grooves extending from end to end, and running at a slight angle to the axis.

Two operatives stand, one at each side of the machine, and each works in the usual way and entirely independent of the other, and has the facility for throwing his own rollers into and out of gear without interfering with those on the other side of the machine, and of raising and lowering his frame and top rollers as required by means of his own treadle, which is much less laborious than the ordinary method of raising the frame up by hand, and thus both space and labor are economized.

Figure 4:

We are aware that spiral ribs have been arranged upon the rollers of felting-machines, and are shown in the English patent No. 455, granted in 1866. It will be seen, however, that the projections on the rolls $d$ and $e$ are either annular, as shown in figs. 3, 4, and 5, or curved and disposed at an angle to each other, as shown in figs. 6 and 7.

Having now fully described the nature and object of our said invention, together with the construction and operation of the same, we wish it to be understood that

We claim as our invention—

1. The rollers $d\,e$, each having on its surface a series of short inclined ribs, arranged as shown in figs. 6 and 7 of the drawing, and operating as herein described.

2. Forming the working-surface of the rollers of elliptical rings, of India rubber or other suitable material, placed at such an angle on the rollers and at such a distance apart that the upper edges of each shall overlap the lower edges of the next one, as shown in figs. 3 and 5 on the drawings.

3. The mode of and apparatus for driving and raising and lowering the rollers, substantially as hereinbefore described and illustrated in the drawings annexed.

In testimony whereof we have signed our names to this specification in the presence of two subscribing witnesses.

JAMES KIRK.
SAMUEL SHELMERDINE.
CEPHAS FROGGATT.

Witnesses;
GEORGE DAVIES, C. E.,
JOHN HUGHES.